V. ZACHERT.
PROCESS OF FOAM REDUCTION.
APPLICATION FILED JULY 17, 1917.

1,261,671.

Patented Apr. 2, 1918.

INVENTOR.
Victor Zachert.

BY
Carlos P. Griffin
ATTORNEY.

UNITED STATES PATENT OFFICE.

VICTOR ZACHERT, OF SAN FRANCISCO, CALIFORNIA.

PROCESS OF FOAM REDUCTION.

1,261,671.      Specification of Letters Patent.      Patented Apr. 2, 1918.

Application filed July 17, 1917. Serial No. 181,051.

*To all whom it may concern:*

Be it known that I, VICTOR ZACHERT, citizen of the United States, residing at San Francisco, in the county of San Francisco, State of California, have invented a new and useful Process of Foam Reduction, of which the following is a specification in such full and clear terms as will enable those skilled in the art to construct and use the same.

This invention relates to a process for removing the gas from froth to permit the concentration or collection of the substance forming the froth.

It will be understood by those skilled in the art that in many metal recovery processes, sugar recovery processes, gas making processes and other industrial chemical and mechanical processes there is formed a vast amount of foam or froth which carries off in one way or another large quantities of valuable material, and which material it is very difficult to economically collect for further treatment.

It will also be understood by those skilled in the art that such froth is maintained in its expanded condition because of the presence of minute particles of gas entangled therewith, so that if the gas is once removed therefrom, the particles of material entangled therewith may be collected by the ordinary filtration or concentration methods.

In the drawings there is illustrated an apparatus capable of carrying out the process, and in which the same reference numeral is applied to the same portion throughout.

Figure 1:
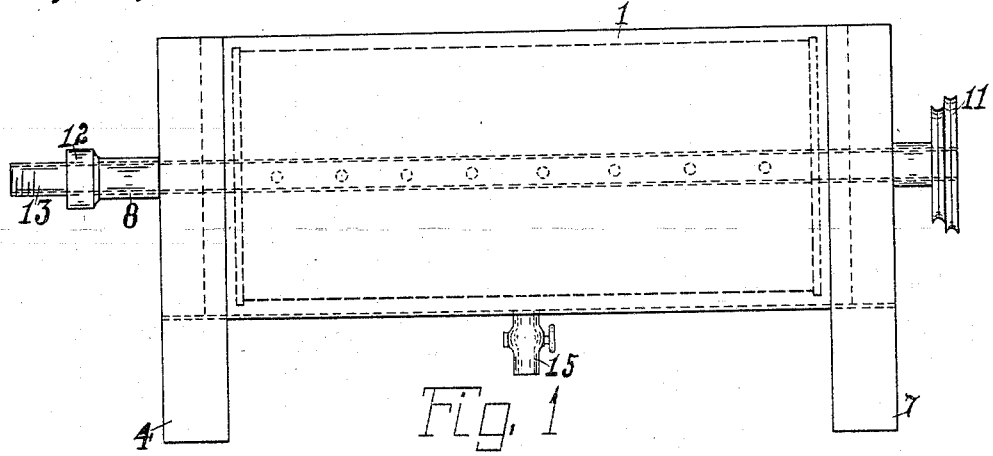
Figure 1 is a side elevation of the complete apparatus
Figure 2:
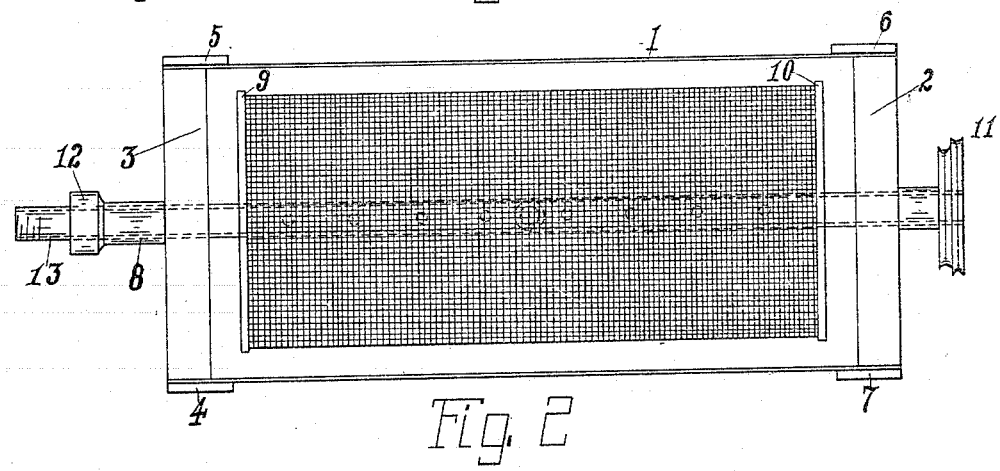
Fig. 2 is a plan view of the apparatus.
Figure 3:
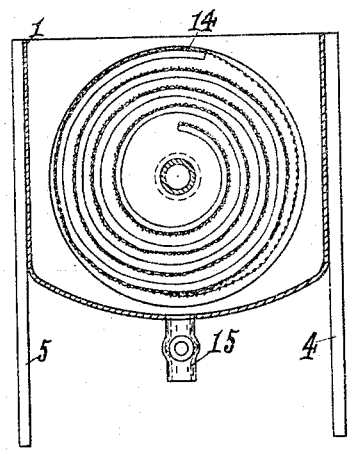
Fig. 3 is a transverse sectional view of the apparatus.

The apparatus consists of a trough 1, having end pieces 2 and 3, which end pieces form closures for the trough. Legs 4 to 7 inclusive support the trough at a suitable elevation. Extending through the trough is a hollow shaft 8 which has a plurality of openings therein between a pair of circular heads 9 and 10 carried thereby. The revoluble tube 8 carries a pulley 11 at one end, and a stuffing box 12 at the other end into which a supply pipe 13 extends. The heads 9 and 10 support a spirally wound sheet of foraminous material 14 into the center of which the incoming material including the foam is discharged. At the bottom of the tank or trough there is a discharge valve 15.

In operation the pulp containing the foam is forced through the pipe 13 and the screen drum is rotated at a suitable speed to keep the screen clear and to keep the pulp and foam of uniform density. As the foam is forced out of the screen, the gas bubbles retained in the foam are broken up and the pulp carries off the material which formed the foam in suspension.

In practice it has been ascertained that a very moderate speed is sufficient to keep the screen clear when treating most of the industrial foams, the pulp being discharged from the trough as a water solution with the particles which formed the foam in suspension therein and not floating thereon.

After the pulp has been passed through the screen drum, the suspended solid particles or the substance in solution, as for example soap may be removed by any suitable concentration or other process.

Having thus described my invention what I claim as new and desire to secure by Letters Patent of the United States is as follows, express reservation being made of permissible modification.

1. The process of pulping froth which consists in collapsing the gas bubbles in the froth by passing the froth through the interstices of a foraminous membrane.

2. The process of pulping froth which consists in collapsing the gas bubbles carried by the froth by passing the froth through the interstices of a plurality of foraminous membranes and withdrawing the froth and liquid carrying the same as a substantially homogeneous pulp.

3. The process of pulping froth which consists in collapsing the froth gas bubbles by forcing the froth and gas bubbles carried thereby through the interstices of a foraminous body by pressure on the liquid.

4. The process of pulping froth or foam which consists in collapsing the gas bubbles carried by the froth or foam by forcing them through a series of moving foraminous bodies by pressure, and thereafter separating the solid particles from the liquid carrying them.

In testimony whereof I have hereunto set my hand this 28" day of June, A. D. 1917.

VICTOR ZACHERT.